United States Patent
Ulm et al.

(10) Patent No.: US 6,397,822 B1
(45) Date of Patent: Jun. 4, 2002

(54) INTEGRATED FUEL SYSTEM UNIT WITH TWO-STAGE MARINE FUEL PUMP

(75) Inventors: Ralph Ulm; Bruce A. Stephen; Rodney K. Boutwell; Paul M. Meyer, all of Fairfield, IL (US)

(73) Assignee: UIS, Inc., Jersey City, NJ (US)

( * ) Notice: Subject to any disclaimer, the term of this patent is extended or adjusted under 35 U.S.C. 154(b) by 0 days.

(21) Appl. No.: 09/551,586

(22) Filed: Apr. 18, 2000

(51) Int. Cl.[7] ............................................... F02M 37/04
(52) U.S. Cl. ...................... 123/509; 123/510; 123/541; 123/25 R
(58) Field of Search ................................ 123/509, 510, 123/541, 41.31, 25 A, 25 R, 25 E

(56) References Cited

U.S. PATENT DOCUMENTS

| | | | |
|---|---|---|---|
| 3,606,868 A | * | 9/1971 | Voogd ........................ 123/25 R |
| 3,835,822 A | | 9/1974 | Mickle et al. |
| 3,973,536 A | | 8/1976 | Zelders |
| 4,084,564 A | | 4/1978 | Rickert |
| 4,296,723 A | * | 10/1981 | Aldrich ....................... 123/510 |
| 4,602,605 A | * | 7/1986 | Adkins ........................ 123/516 |
| 4,689,025 A | | 8/1987 | Ferguson |
| 4,728,306 A | | 3/1988 | Schneider |
| 4,768,492 A | | 9/1988 | Widmer et al. |
| 4,848,283 A | | 7/1989 | Garms et al. |
| 4,979,482 A | * | 12/1990 | Bartlett ........................ 123/510 |
| 4,980,588 A | | 12/1990 | Ogawa |
| 5,015,159 A | | 5/1991 | Mine et al. |
| 5,046,471 A | | 9/1991 | Schmid |
| 5,103,793 A | | 4/1992 | Riese et al. |
| 5,195,494 A | * | 3/1993 | Tuckey ........................ 123/514 |
| 5,231,967 A | | 8/1993 | Baltz et al. |
| 5,392,750 A | * | 2/1995 | Laue et al. .................. 123/509 |
| 5,438,962 A | | 8/1995 | Iwata et al. |
| 5,647,330 A | | 7/1997 | Sawert et al. |
| 5,647,331 A | | 7/1997 | Swanson |
| 5,694,895 A | | 12/1997 | Tsunoda et al. |
| 5,908,020 A | * | 6/1999 | Boutwell et al. ............ 123/541 |
| 6,029,633 A | * | 2/2000 | Brandt ......................... 123/509 |
| 6,073,614 A | * | 6/2000 | Kleppner ..................... 123/509 |
| 6,170,472 B1 | * | 1/2001 | Gaston et al. ............... 123/509 |

* cited by examiner

*Primary Examiner*—Carl S. Miller
(74) *Attorney, Agent, or Firm*—Polster, Lieder, Woodruff & Lucchesi, L.C.

(57) ABSTRACT

An integrated fuel system unit (10) comprises a two-stage fuel pump (16) and fuel filter (34). The fuel filter is interposed between the first and second pump stages (S1,S2) so fuel flowing between the stages is drawn through the filter. A spiral-wound fuel line (44) delivers fuel from a fuel inlet (18) to the first pump stage. Water is circulated about the fuel line to cool the fuel flowing therethrough. A fuel pressure regulator (60) in an outlet (20) of the unit diverts fuel from the engine back to a cavity (36) in which the filter is housed if an overpressure condition occurs. This fuel is then mixed with the fuel flowing between pump stages. Water also collects in the cavity and a solenoid (74) controlled water passage (72) allows this water to be entrained with fuel flowing to the second pump stage for the water and fuel to be mixed together and pumped to an internal combustion engine to be combusted therein.

20 Claims, 7 Drawing Sheets

INTEGRATED FUEL SYSTEM UNIT WITH TWO-STAGE MARINE FUEL PUMP

CROSS-REFERENCE TO RELATED APPLICATIONS

None.

BACKGROUND OF THE INVENTION

This invention relates to fuel delivery components for use with water-cooled internal combustion engines in a marine environment, and more specifically to an integrated fuel system unit including a two-stage water-cooled marine fuel pump, the unit having improved hot fuel and fuel vapor handling characteristics.

In co-assigned U.S. Pat. No. 5,908,020 there is described a water cooled fuel pump for use in marine applications. The pump described therein is a single-stage fuel pump having the advantage of combining the fuel pump, fuel filter, and pressure regulator into a single sealed enclosure in order to, among other things, reduce the space required within a compartment housing the boat engine and its associated components. While the pump assembly solved various problems arising from a grouping in an advantageous manner, other problems still need to be addressed.

A particular problem includes starting the boat in hot weather. At such times, the temperature within the engine compartment can easily reach 135° F. and up to 150° F. under hot soak conditions. If the boat operator attempts to start the boat at that time, two problems often occur. First, the engine may be difficult to start. Second, even if the engine does start, oftentimes the boat gets only a short distance away from the dock before the engine dies and the boat is adrift.

As described in the referenced patent, water to cool the engine can be drawn into the fuel pump, and circulated through the pump, before flowing to the engine, to cool the fuel flowing through pump. Also, small amounts of water often collect in the fuel circuit assembly and it would advantageous to intermix this water with the fuel circulating through the pump for the fuel/water mixture to be pumped to the engine and burned.

SUMMARY OF THE INVENTION

Among the several objects and advantages of the present invention may be noted the provision of an integrated fuel system unit for boats and the like which includes, in combination, a two-stage fuel pump, fuel filter, and pressure relief valve;

the provision of such a unit in which the components are commonly housed to minimize the space required for installation of the housing within an engine compartment;

the provision of such a unit having a water coolant system which optimally cools the fuel pump and fuel flowing therethrough so to prevent hot fuel and vapor lock problems with the engine, particularly at start-up;

the provision of such a two-stage pump in the unit which is capable of providing fuel to the engine under relatively high pressure;

the provision of such an integrated unit to employ a filter between the first stage pump and second stage pump, the filter being a pressurized filter;

the provision of such an integrated unit to re-circulate fuel returned from the pressure regulator and to entrain water accumulating in a chamber where the filter is installed, the fuel and entrained water being pumped to the engine and combusted therein;

the provision of such an integrated unit to be a lightweight assembly with the sealed enclosure in which the pump is housed to be adapted for mounting on the block of the engine; and, the provision of such an integrated unit which facilitates starting and running of the engine, which improves performance of the engine under a wide range of operating conditions, and which is readily installed and removed for service or replacement.

Briefly stated, the present invention is directed to an integrated fuel system unit incorporating a two-stage fuel pump for marine engines. The fuel pump is installed in a housing together with a fuel filter and pressure regulator. A spiral-wound fuel line composed of a heat-conductive material extends concentrically about the fuel pump to minimize the space required for pump installation in an engine compartment. Water for cooling both the fuel pump and fuel flowing in the fuel line is provided by a cooling system enclosing the pump housing and the fuel line in a sealed chamber through which the water circulates. If an overpressure condition occurs in the fuel line or fuel rail between the pump and engine, a fuel pressure regulator located between the fuel line and fuel rail returns fuel to a fuel cavity in which the fuel filter is housed, thereby providing a closed loop system. Fuel flow through the pump is such that fuel is pumped through the first stage of the pump, then through the fuel filter and into the second stage of the pump. The bypass fuel returned from the pressure regulator is delivered into the portion of the housing in which the filter is mounted so it can be entrained with fuel now flowing into the second stage of the pump. Any water in the fuel supply line also accumulates in this area so to also be entrained with the fuel and combusted in the engine. Provision of the two-stage fuel pump together with the other components provides cool fuel under high pressure to the engine, facilitates quick starting of the engine, and minimizes the possibility of vapor lock shutting down the engine when the vessel is underway.

The foregoing and other objects, features, and advantages of the invention as well as presently preferred embodiments thereof will become more apparent from the reading of the following description in connection with the accompanying drawings.

BRIEF DESCRIPTION OF THE DRAWINGS

In the accompanying drawings which form part of the specification.

Corresponding reference numerals indicate corresponding parts throughout the several figures of the drawings.

DESCRIPTION OF A PREFERRED EMBODIMENT

Figure 2:
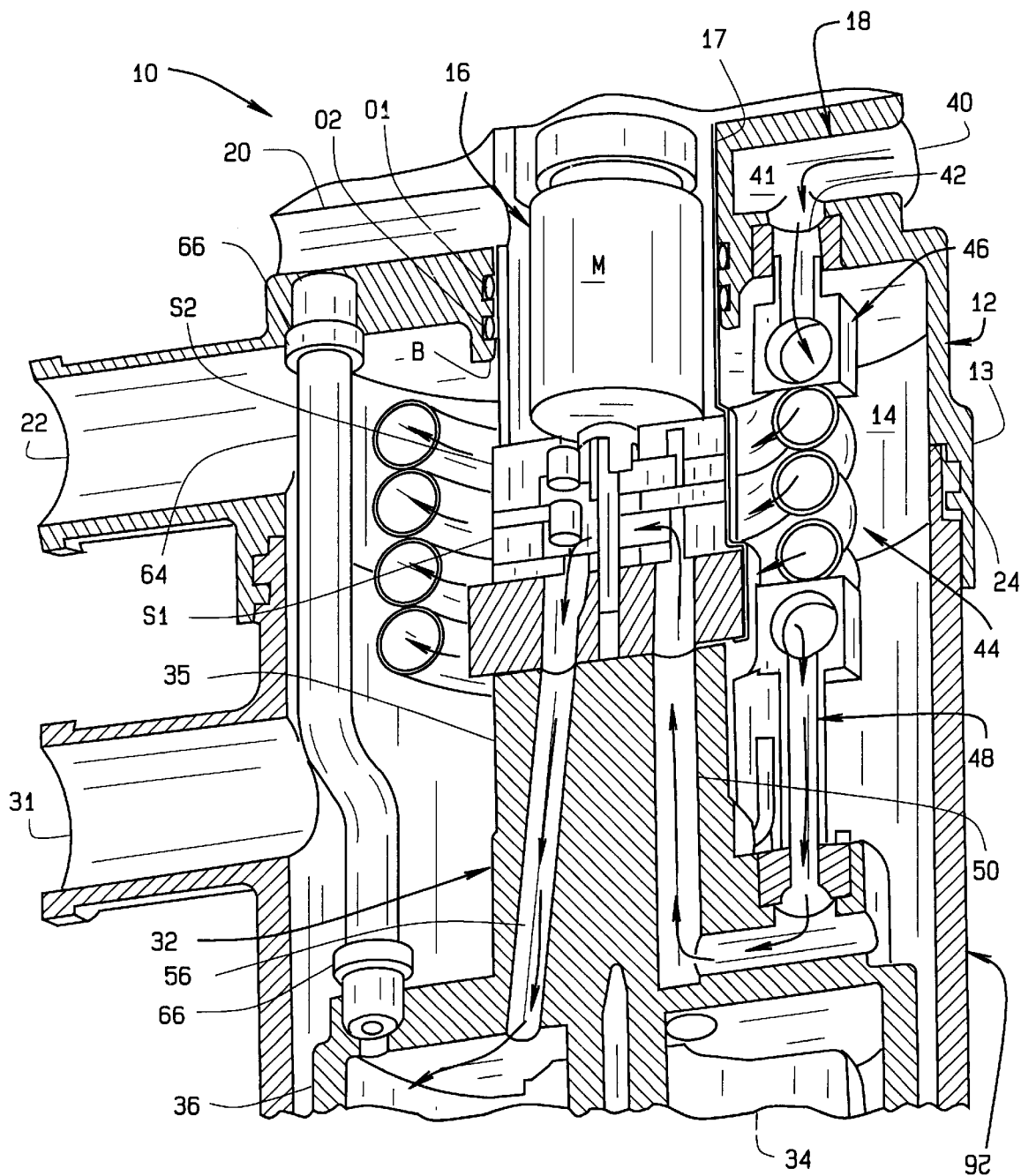
FIG. 2 is a partial elevational view of the fuel system unit, also in section, showing a fuel flow path from a fuel inlet of the assembly into a first stage of the pump and from the first stage to a fuel filter cavity portion of the assembly.
Figure 3:
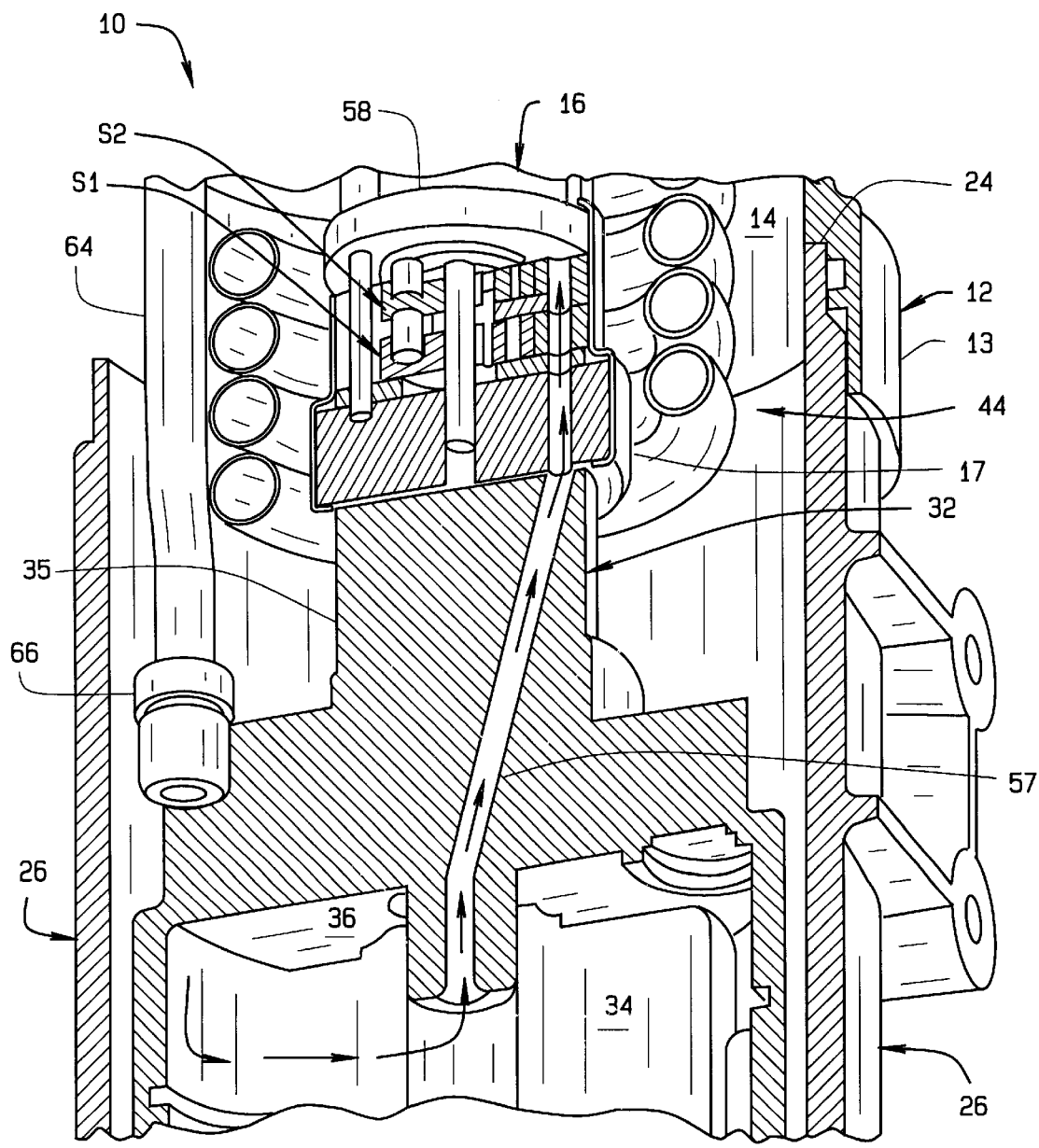
FIG. 3 is another partial elevational view of the fuel system unit, also in section, showing the fuel flow path through the filter and to a second stage of the pump.

Referring to the drawings, an integrated fuel system unit of the present invention is for installation in the engine compartment (not shown) for an internal combustion marine engine (also not shown). The unit is indicated generally 10 in the drawings. The unit includes a main body or housing 12 of a generally cylindrical shape. Body 12 defines a hollow, cylindrical enclosure 14 in which is housed a two-stage D.C. motor driven fuel pump 16. As shown in FIG. 2, body 12 has a central bore B extending therethrough from the upper end of the body into enclosure 14. A sleeve 17 is inserted through this bore. The sleeve is appropriately formed as shown in the drawings to enclose the constituent elements comprising fuel pump 16 and its electrical connection to a source of power. O-rings O1–O4 provide appropriate seals between the sleeve and body 12. A motor M of fuel pump 16 is supplied power through electrical terminals E1 and E2 which, in turn, connect with terminal pins T1, T2 of an electrical connector P formed by the upper end of sleeve 17. Connector is connected to a source of electrical power (not shown).

A fuel inlet 18 and fuel outlet 20 are defined in a sidewall of the body. A water inlet 22 comprises a cylindrical nipple extending outwardly from the sidewall of the body. The lower end of body 12 comprises a skirt 13 which is internally threaded, as indicated at 24, to interconnect body 12 with a matingly threaded hollow, cylindrical sleeve 26. The other end of sleeve 26 is also threaded, as indicated at 28, and a matingly threaded cup 30 is screwed onto this other end of the sleeve to enclose the lower portion of unit 10. A water outlet 31 comprising a cylindrical nipple extends outwardly from the sidewall of sleeve 26. Water inlet 22 and water outlet 31 align with each other.

Figure 1:
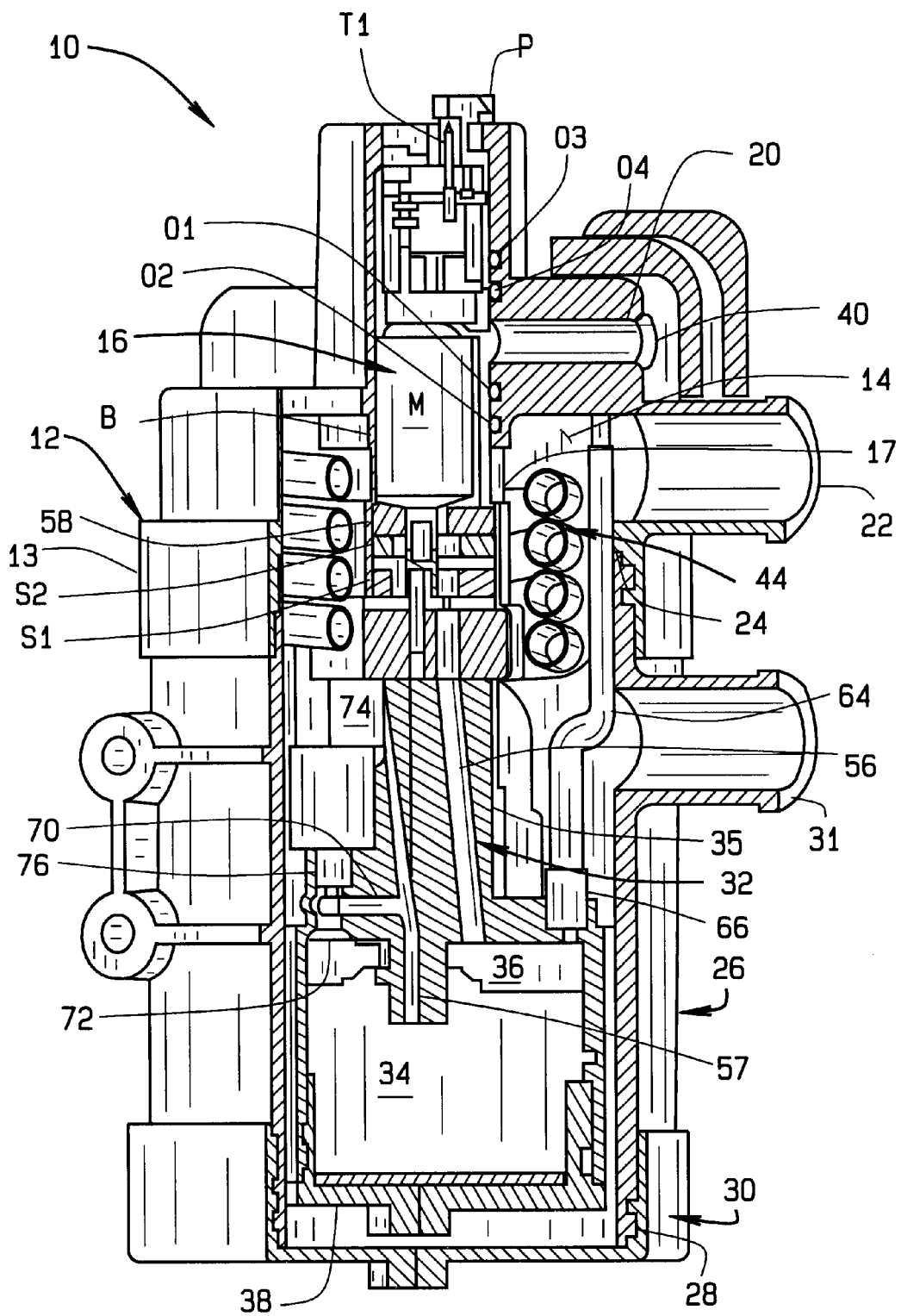
FIG. 1 is an elevational view, partly in section, of an integrated fuel system unit of the present invention including a two-stage fuel pump.
Figure 7:
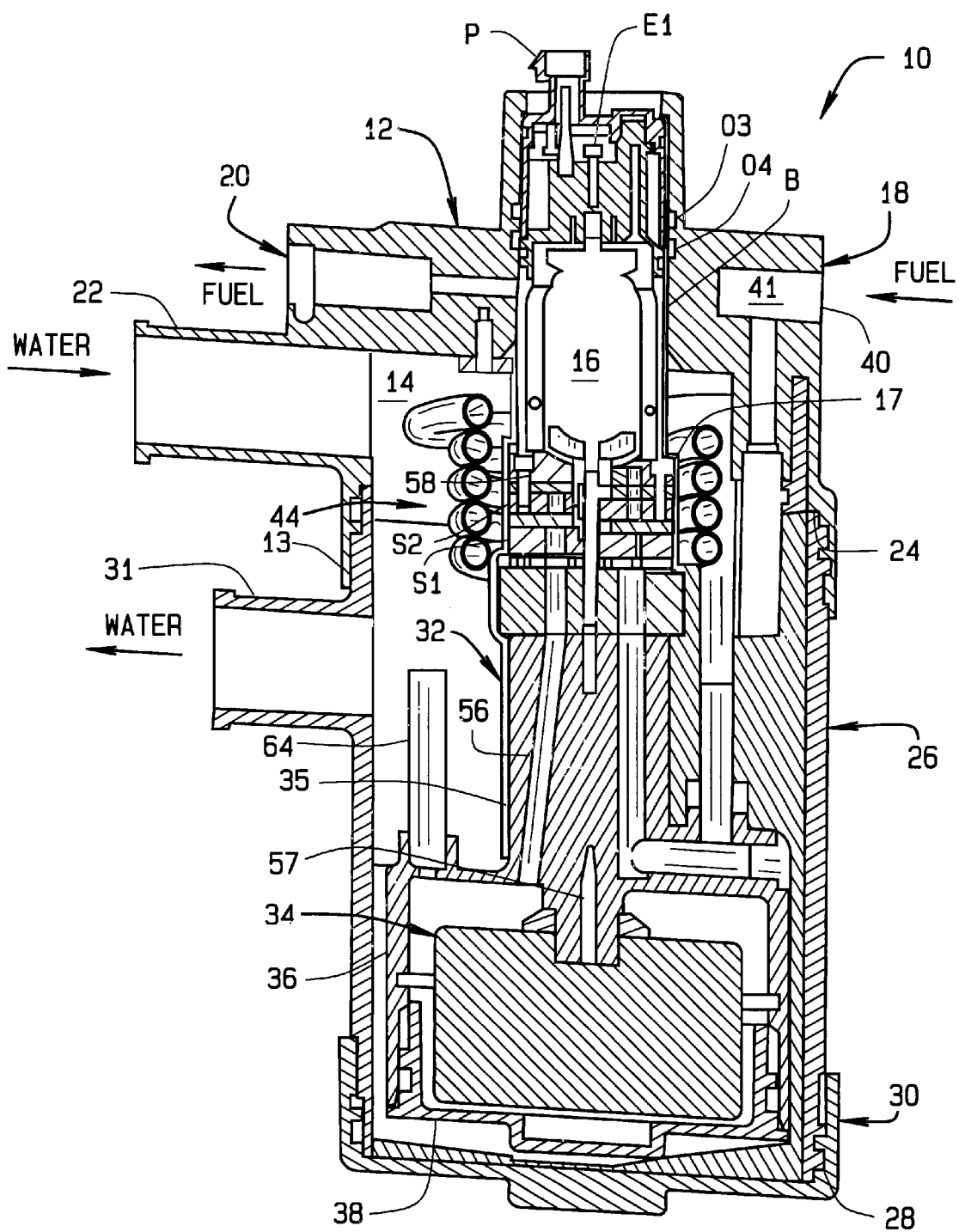

Mounted within body 12 and extending into the area covered by sleeve 26 is an insert 32 in which is defined a series of fuel passages (as described hereinafter) for directing fuel flow to and from respective stages S1 and S2 of fuel pump 16, and a fuel filter 34. Insert 32 includes an upper stem section 35 in which the fuel passages are formed. The lower end of insert 32 forms an inverted cup shaped cavity 36 in which filter 34 is housed. A cap 38 fits over the lower, open end of cavity 36 to encase the fuel filter. As shown in FIGS. 1 and 7, the fuel pump, insert 32, and fuel filter are axially aligned within unit 10. Fuel filter 34 is a conventional filter element and those skilled in the art will recognize that numerous filter elements may be used in the unit. The volume of space within cavity 36 not taken up by the fuel filter forms a reservoir for fuel which is temporarily retained prior to being pumped back to the engine. In addition, and as described hereinafter, small amounts of water in the fuel system also may collect in this reservoir. Sleeve 26, which encloses insert 32, together with the lower end of body 12, and the upper wall surface of cavity 36, define a fuel cooling chamber for the fuel flowing between the fuel inlet 18 and the first stage of pump 16. Cooling of the fuel is described hereinafter.

Referring to FIG. 2, fuel flow into unit 10 is through an inlet port 40 formed in body 12. Port 40 includes a bore 41 extending a short distance inwardly into body 12 on one side of the body. At the inner end of the bore, the fuel empties into an inlet 42 for a spiral wound fuel line 44 which, as shown in the drawings, encircles the lower portion of the fuel pump. The fuel line comprises a conduit formed of a heat conductive material for helping remove heat from the fuel flowing therethrough. As indicated by the arrows in FIG. 2, inlet 42 is formed in the floor of bore 41 and fuel flowing through the inlet flows through a short, hollow tubular fitting 46 into fuel line 44. Fuel exiting fuel line 44 flows into another hollow tubular fitting 48. At the outlet end of fitting 48, the fuel is drawn into an passage 50 extending axially through stem 35 of insert 32 and through which the fuel flows into the first stage S1 of fuel pump 16. Stage S1 of the fuel pump, as is second stage S2 of the pump, is a roller vane pump whose operation is known in the art and will not be described. Fuel pumped from first stage S1 of fuel pump 16 is at a regulated pressure of, for example, eight to ten pounds per square inch (8–10 psi).

Fuel discharged from stage S1 of fuel pump 16 flows into and through another axial passage 56 formed in insert 32. The outlet end of passage 56 discharges fuel into the cavity 36 where fuel filter 34 is located. Fuel is now drawn through the fuel filter to remove dirt or other contaminants in the fuel. From filter 34, fuel is drawn back into another axial passage 57 formed in insert 32. Fuel flowing through passage 57 now flows into second stage S2 of fuel pump 16. Second stage S2 increases the fuel pressure from 8–10 psi to approximately 150 psi. The fuel is then discharged through an outlet section 58 of pump 16 into fuel outlet passage 20. A fuel line (not shown) connects to the outer end of passage 20 for fuel to be pumped through the fuel line to the engine.

Referring to FIG. 1, a pressure regulator 60 is connected to main body 12 of the assembly. The pressure regulator includes a nipple 62 for connection to a pressure line (not shown) by which the pressure of the engine is communicated to the regulator. A bypass fuel line 64 has one end opening into the regulator bypass and the other end of the bypass fuel line opens into cavity 36 where fuel filter 34 is located. Fuel line 64 has fittings 66 on each end for connecting the bypass fuel line in place. When the pressure in the fuel rail exceeds a preset limit, a valve in the bypass regulator opens so fuel in outlet 20 is diverted through fuel line 64 back to cavity 36. The greater the overpressure in the fuel rail, the more the bypass valve in the pressure regulator is opened and the more fuel is bypassed back to the cavity. Since the fuel is collected in the cavity together with the fuel pumped through stage S1 of fuel pump 16, the bypass fuel intermixes and with the fuel pumped through the first stage, and all of the fuel is delivered to stage S2 of the fuel pump as previously described.

Figure 4:
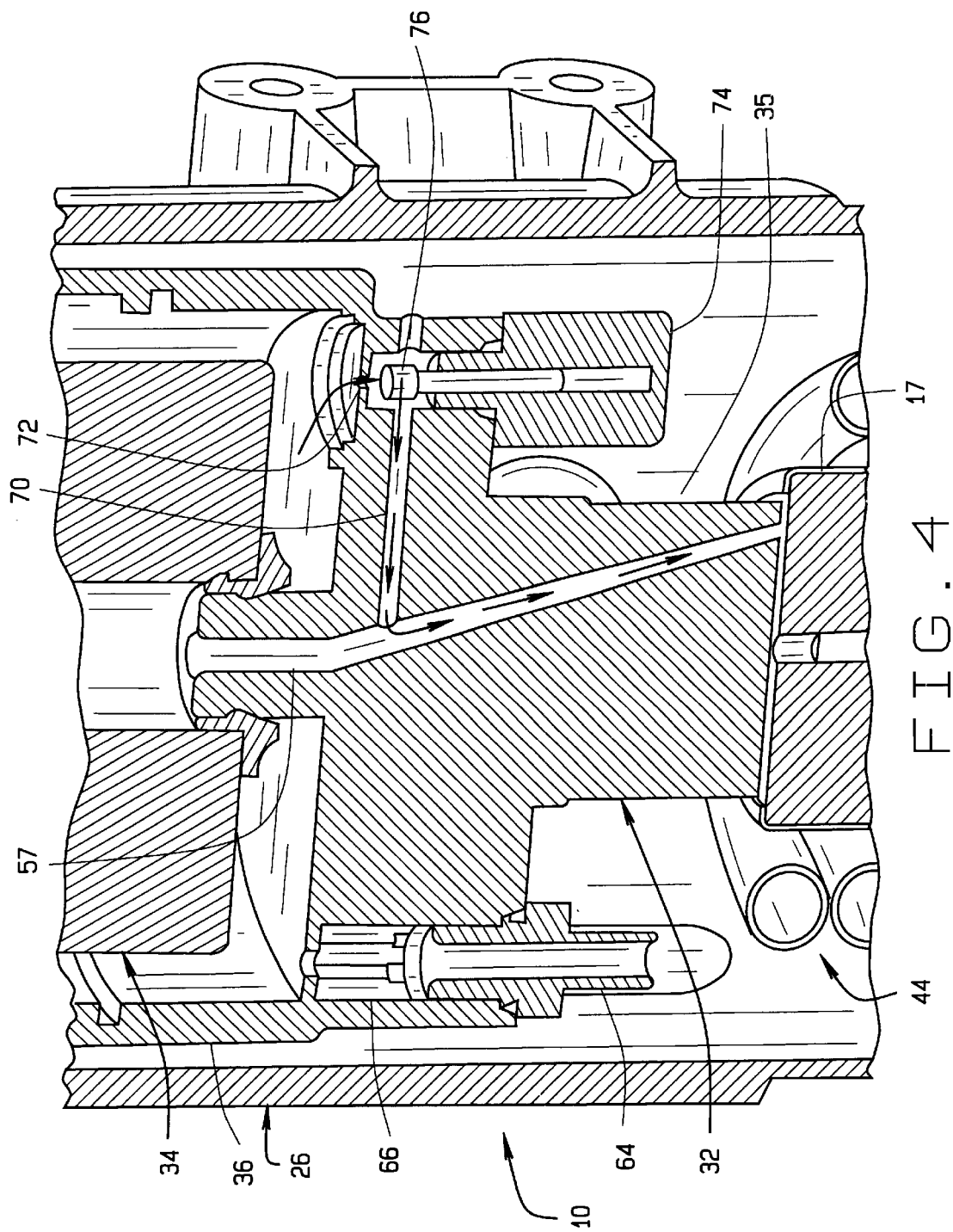
FIG. 4 is further partial elevational view of the fuel system unit, also in section, showing a path by which water accumulating in the filter cavity is entrained with fuel flowing to the second stage of the pump.
Figure 5:
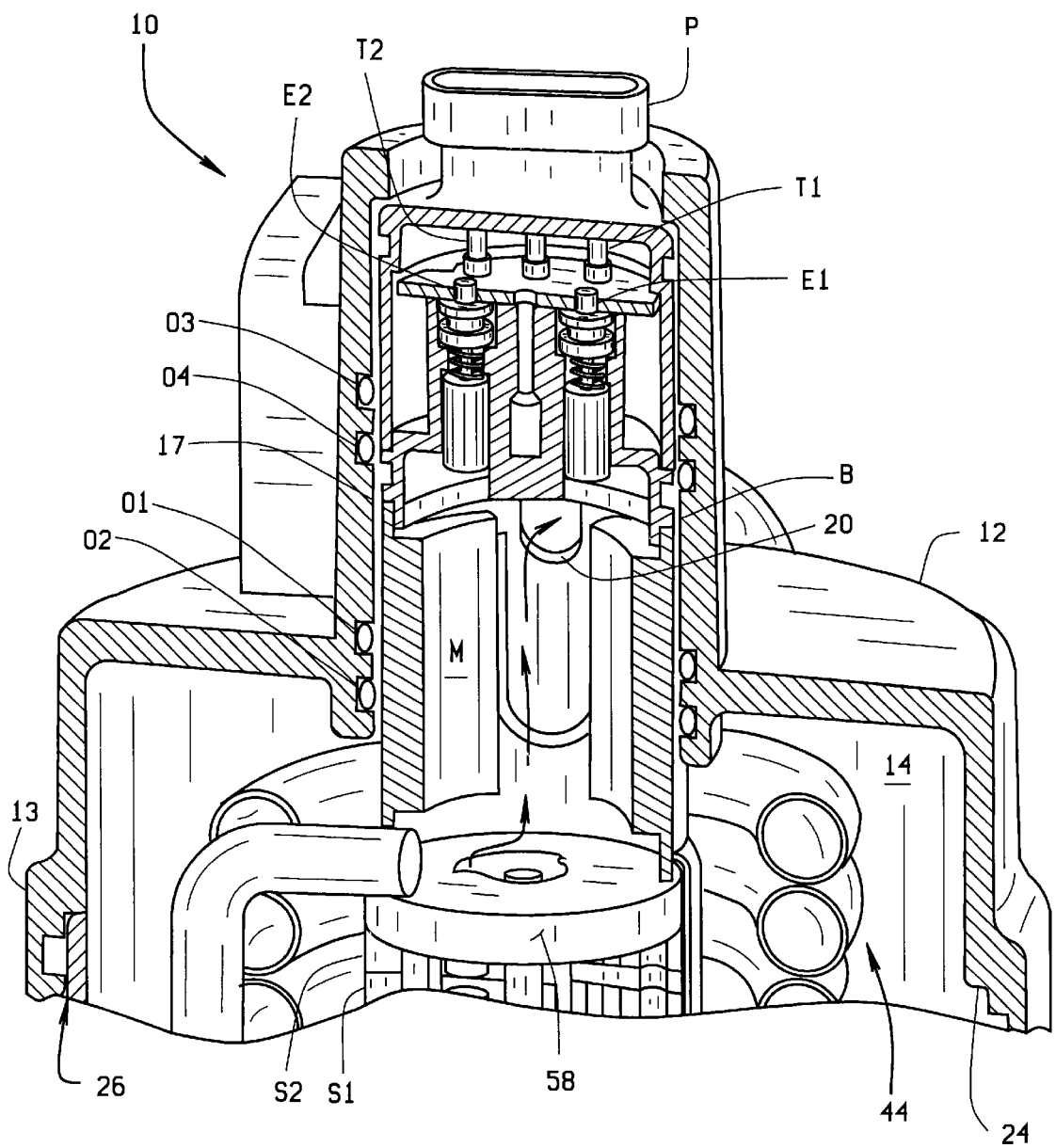
FIG. 5 is another partial elevational view of the fuel system unit, also in section, showing the fuel flow path from the second stage of the pump to a fuel outlet of the unit.

It is not uncommon for water to commingle with the fuel. Condensation in fuel lines, for example, is one source of this water. Because water is heavier than the fuel burned in the engine, when the fuel pumped through stage S1 of the fuel pump is delivered to cavity 36, the water will fall to the bottom of the cavity and collect there. If the water is not removed, over time the amount of collected water will start to restrict the amount of fuel which can circulate through filter 32. To prevent this, unit 10 includes a secondary flow path between the cavity and the second stage of the fuel pump. This passage, as shown in FIGS. 1 and 4, is indicated 70. An opening 72 is formed in the upper wall surface of cavity 36 and provides an inlet to passage 70. The passage extends horizontally through insert 32 and opens into the passage 57 extending between the cavity and the input to the second stage of the fuel pump. Water flow into passage 70 is controlled by a solenoid 74 having a plunger 76. When the solenoid is deactivated, the plunger blocks opening 72. When a water sensor (not shown) senses that the amount of water collected in cavity 36 is getting too great, a sensor output activates the solenoid and the plunger is lifted away from its blocking position. The suction created by the second stage of the fuel pump now draws water into and through passage 70 to passage 57. Now, the water is entrained with the fuel and pumped to the engine where it is burned with the fuel. Alternately, solenoid 74 can be externally controlled; for example, by an engine computer.

Figure 6:
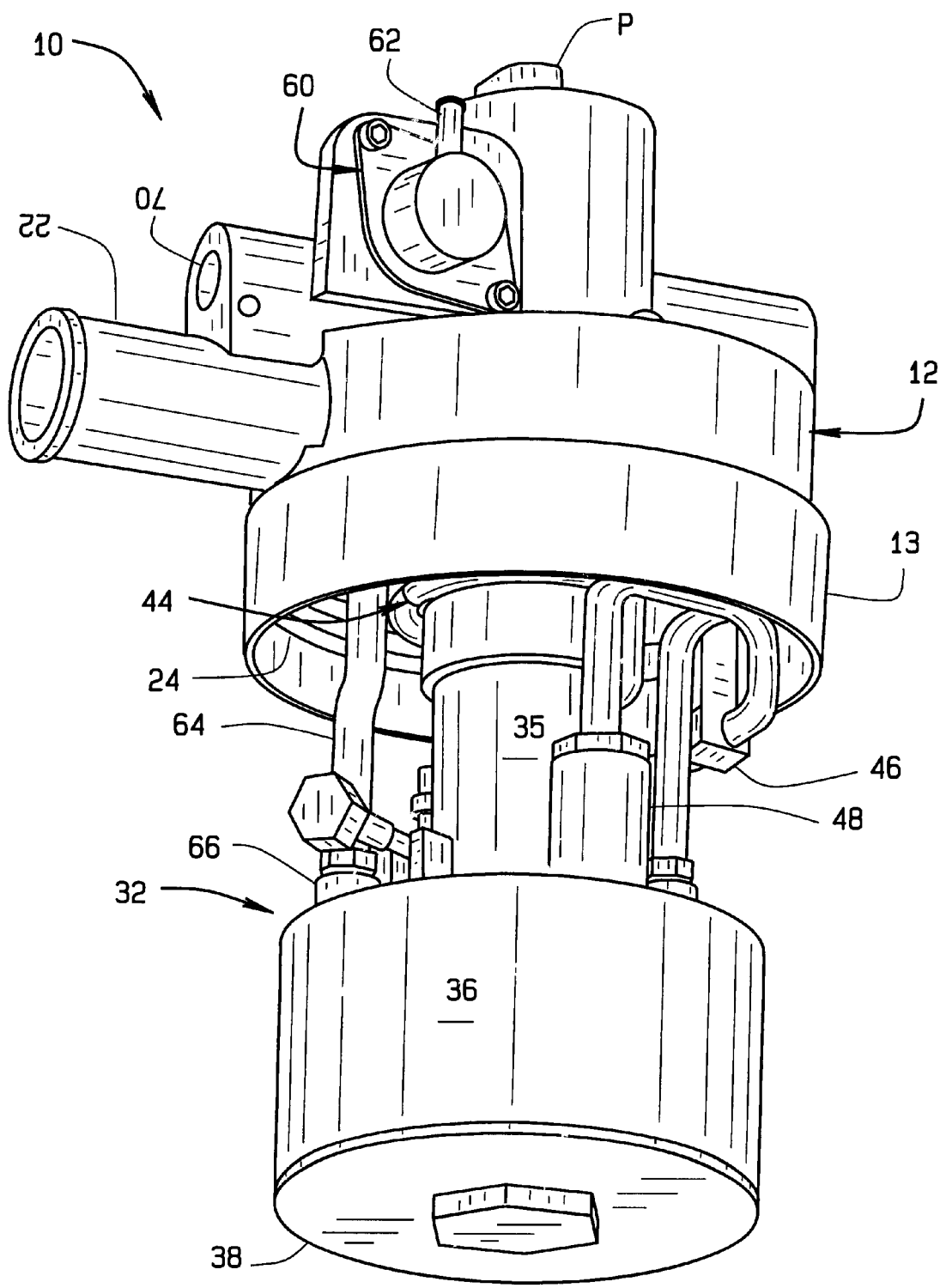
FIG. 6 is a perspective view of fuel system unit with a lower cover portion of the assembly removed so to illustrate fuel line routing within the assembly; and, FIG. 7 is another elevational view, in section, of the fuel system unit.

To remove excess heat from unit 10 and cool the fuel flowing through the unit prior to its injection into the fuel rail of the engine, helical fuel line 44 and the exterior surface of sleeve 17 are subjected to the flow of water circulating between water inlet 22 and water outlet 31. The circulating water flows both about fuel line 44 and through the space formed between the fuel line and the exterior wall of the sleeve. Further, and as shown in FIG. 6, the water also flows about the fittings 46 and 48 for fuel line 44, and about bypass fuel line 64. Flow of the water is by a water pump (not shown) which pumps the water from unit 10 to the engine to cool the engine. Those skilled in the art will recognize that the integrated fuel system unit 10 may be readily adapted for use with a variety of external cooling systems, and may operate with either fresh-water or sea-water as a liquid coolant, or with a variety of heat-absorbing fluids commonly used as liquid coolants.

Operation of the unit 10 is as follows: Fuel drawn from a fuel tank enters the unit through port 40, and is drawn to first stage S1 of fuel pump 16, through fuel line 44 and fuel passage 50 in insert 32. From stage S1, the fuel flows into cavity 36 through passage 56 where it is drawn into fuel filter 34. This fuel, together with fuel deposited in the cavity through bypass fuel line 64 of pressure regulator 60 is now drawn up through passage 57 to stage S2 of the fuel pump. Water collected in the cavity can be entrained in this fuel flow by activating solenoid 74 to allow water to be drawn through an opening 72 in the top of cavity 36 so fuel can flow through a passage 70 in insert 32 whose downstream end opens into passage 57. From the second stage of pump 16, the high pressure fuel is directed to fuel outlet 20. Pressure regulator 60, if activated can divert a portion of this outlet fuel back to cavity 36 through line 64 as previously mentioned.

What has been described is an integrated fuel system unit especially for use in boats. The unit combines a two-stage fuel pump, fuel filter, and pressure relief valve, as well as a water coolant system for cooling fuel circulating through the unit. All the components are commonly housed to minimize the space required for installation of the unit within an engine compartment. The unit optimally cools both the fuel pump and fuel flowing therethrough to prevent hot fuel and vapor lock problems with the engine. Further, the pump is capable of providing fuel to the engine under relatively high pressure. Bypass fuel is recirculated through the second stage of the pump as is water accumulating in the unit and entrained with the fuel. The unit comprises a lightweight assembly which is readily installed and removed for service or replacement.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

What is claimed is:

1. An integrated fuel system unit for use with an internal combustion engine comprising:

a multi-stage fuel pump;

fuel delivery means for delivering fuel from a source thereof to a first stage of the pump;

a fuel filter interposed between the first stage of the pump and a second stage thereof, fuel pumped from the first stage of the pump being delivered to the fuel filter and flowing therethrough to the second stage of the pump;

a fuel outlet from the pump by which fuel discharged from the pump is delivered to the engine;

a pressure regulator in the fuel outlet for returning a portion of the fuel which would otherwise be delivered to the engine to an inlet of the fuel filter when the fuel pressure sensed by the regulator exceeds a predetermined pressure, for the returned fuel to be recycled back through the fuel pump with the fuel flowing from the first stage;

means for cooling the fuel as it flows to the pump thereby to facilitate engine starting and prevent vapor lock; and, an upper body portion in which the fuel pump is housed, and an insert attached to a lower end portion of the body portion, a lower end portion of the insert defining a cavity in which the fuel filter is housed.

2. The integrated fuel system unit of claim 1 wherein the insert includes a plurality of fuel passages by which fuel flows between stages of the fuel pump and the fuel filter.

3. The integrated fuel system unit of claim 2 wherein a fuel inlet is formed in the upper body portion of the housing and the fuel delivery means includes a fuel line extending about an outer surface of the insert, one end of the fuel line connecting to the fuel inlet, and the other end of the fuel line connecting to a passage formed in the insert by which fuel is delivered to an inlet of the first stage of the fuel pump.

4. The integrated fuel system unit of claim 3 wherein the means for cooling includes a cooling chamber in which the fuel line is mounted and means for circulating a coolant through the chamber and about the fuel line.

5. The integrated fuel system unit of claim 4 wherein the fuel line is a spiral conduit circling about the insert inside the cooling chamber.

6. The integrated fuel system unit of claim 4 further including a sleeve extending between the lower end of the body portion and the cavity in which the fuel filter is housed, the sleeve, together with a wall defining the cavity and a skirt section of the body portion, enclosing the insert and defining the cooling chamber.

7. The integrated fuel system unit of claim 6 wherein the coolant is water and a water inlet is defined in the body portion and a water outlet in the sleeve to circulate water through the chamber.

8. The integrated fuel system unit of claim 4 further including a fuel return line extending between the fuel outlet and fuel filter by which the pressure regulator returns fuel to the fuel filter, the fuel return line extending through the cooling chamber.

9. An integrated fuel system unit for use with an internal combustion engine comprising:

a multi-stage fuel pump;

fuel delivery means for delivering fuel from a source thereof to a first stage of the pump;

a fuel filter interposed between the first stage of the pump and a second stage thereof, fuel pumped from the first stage of the pump being delivered to the fuel filter and flowing therethrough to the second stage of the pump;

a fuel outlet from the pump by which fuel discharged from the pump is delivered to the engine;

a pressure regulator in the fuel outlet for returning a portion of the fuel which would otherwise be delivered to the engine to an inlet of the fuel filter when the fuel pressure sensed by the regulator exceeds a predetermined pressure, for the returned fuel to be recycled back through the fuel pump with the fuel flowing from the first stage; and means for entraining water with the fuel so the water and fuel are together combusted in the engine.

10. The integrated fuel system unit of claim 9 further including an upper body portion in which the fuel pump is housed, and a insert attached to a lower end portion of the body portion, a lower end portion of the insert defining a cavity in which the fuel filter is housed, the insert including a plurality of fuel passages by which fuel flows between stages of the fuel pump and the fuel filter.

11. The integrated fuel system unit of claim 10 wherein water is collected in the fuel filter cavity and the means for entraining the water with the fuel includes a water passage formed in the insert and extending between the cavity and a fuel passage by which fuel is directed from the fuel filter to the second stage of the pump.

12. The integrated fuel system unit of claim 11 wherein the means for entraining the water further includes an opening formed in the cavity and defining an inlet end of the water passage, and a solenoid for opening and closing the opening.

13. The integrated fuel system unit of claim 12 wherein the solenoid includes a plunger which blocks the opening when the solenoid is deactivated but moves away from the opening when the solenoid is activated to allow water to flow through the water passage.

14. An integrated fuel system unit for use with an internal combustion marine engine comprising:

a body in which is defined a fuel inlet and a fuel outlet;

a two stage fuel pump mounted in said body, fuel being drawn from a source thereof to an inlet of the first stage of the pump with fuel being pumped from the second pump stage to the engine through the fuel outlet;

a fuel filter interposed between the first and second stage and through which fuel is drawn from the first stage to the second stage;

means defining a cavity in which the fuel filter is housed and in which water collects;

a pressure regulator in the fuel outlet for diverting fuel from the outlet to the cavity if an overpressure condition occurs, the fuel diverted to the cavity missing with the fuel being drawn from the first stage to the second stage of the pump through the fuel filter;

means for entraining the water collected in the cavity with the fuel flowing to the second stage of the pump; and, a fuel cooling means for cooling the fuel flowing from the fuel inlet to the first stage of the pump and the fuel diverted by the pressure regulator from the fuel outlet to the cavity.

15. The integrated fuel system unit of claim 14 further including an insert attached to a lower end portion of the body, a lower end portion of the insert defining the cavity in which the fuel filter is housed, the insert including a plurality of fuel passages by which fuel flows between stages of the fuel pump and the fuel filter, and a fuel line extending about an outer surface of the insert, one end of the fuel line connecting to the fuel inlet, and the other end of the fuel line connecting to a passage formed in the insert by which fuel is delivered to an inlet of the first stage of the fuel pump.

16. The integrated fuel system unit of claim 15 wherein the fuel line is a spiral conduit circling about the insert, and the unit further includes a sleeve extending between the body portion and the cavity in which the fuel filter is housed, the sleeve, together with a wall defining the cavity and a skirt section of the body, enclosing the insert and defining a cooling chamber through which water circulates to cool the fuel flowing through the fuel line, a water inlet being is defined in the body and a water outlet in the sleeve.

17. The integrated fuel system unit of claim 16 wherein the means for entraining the water further includes an opening formed in the cavity and defining an inlet end of a water passage formed in the insert and communicating with a fuel passage therein by which fuel flows from the fuel filter to the second stage of the pump, and a solenoid for opening and closing the opening.

18. The integrated fuel system unit of claim 17 wherein the solenoid includes a plunger which blocks the opening when the solenoid is deactivated but moves away from the opening when the solenoid is activated to allow water to flow through the water passage.

19. A fuel system unit for use with an internal combustion marine engine to supply fuel to the engine during start-up of the engine after a hot soak condition so that a vapor lock condition does not occur which would otherwise cause the engine to stop running comprising:

a body in which is defined a fuel inlet and a fuel outlet;

a two stage fuel pump mounted in said body, fuel being drawn from a source thereof to an inlet of the first stage of the pump with fuel being pumped from the second pump stage to the engine through the fuel outlet;

means defining a pressurized fuel chamber in which the fuel pumped through the first stage of the pump collects prior to being drawn into the second pump stage, there being no fuel vapors present in the fuel in the chamber and the size of the chamber being such that the quantity of fuel in the chamber when the engine is shut-off and the pump is not pumping is sufficient to both start the engine and keep it running for a period of time after the engine is started; and, fuel cooling means for cooling the fuel flowing from the fuel inlet to the fuel pump upon start-up of the engine, the fuel pump pumping a sufficient volume of cool fuel through the chamber so that when the volume of fuel in the chamber at engine start-up is exhausted, sufficient cool fuel is flowing through the chamber to the second pump stage and the engine that the engine does not stop running.

20. A method of supplying fuel to an internal combustion marine engine to start-up the engine after a hot soak condition and then supply cool fuel to engine so that a vapor lock condition does not occur which would otherwise cause the engine to stop running comprising:

drawing fuel from a source thereof to an inlet of a first stage of a multi-stage fuel pump with fuel being pumped from a second stage of the pump to the engine through a fuel outlet, fuel pumped through the first pump stage being drawn through a pressurized fuel chamber into the second pump stage, there being no fuel vapors present in the fuel in the chamber, and the size of the chamber being such that the quantity of fuel in the chamber when the engine is shut-off and the pump is not pumping is sufficient to both start the engine and keep it running for a period of time after the engine is started; and, cooling fuel flowing from the fuel inlet to the fuel pump after the engine is started to a temperature at which no vapors are present in the fuel, the fuel pump pumping a sufficient volume of cool fuel through the chamber that when the volume of fuel in the chamber at engine start-up is exhausted, sufficient cool fuel is flowing through the chamber to the second pump stage and the engine that the engine does not stop running.

* * * * *